(12) United States Patent
Wigren et al.

(10) Patent No.: US 9,549,408 B2
(45) Date of Patent: Jan. 17, 2017

(54) INTERFERENCE CONGESTION CONTROL

(71) Applicant: Telefonaktiebolaget L M Ericsson (publ), Stockholm (SE)

(72) Inventors: Torbjörn Wigren, Uppsala (SE); Patrik Karlsson, Stockholm (SE); Waikwok Kwong, Solna (SE); Billy Hogan, Sollentuna (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 123 days.

(21) Appl. No.: 14/405,354

(22) PCT Filed: Mar. 14, 2013

(86) PCT No.: PCT/SE2013/050252
§ 371 (c)(1),
(2) Date: Dec. 3, 2014

(87) PCT Pub. No.: WO2013/184056
PCT Pub. Date: Dec. 12, 2013

(65) Prior Publication Data
US 2015/0124593 A1    May 7, 2015

Related U.S. Application Data

(63) Continuation of application No. 13/488,187, filed on Jun. 4, 2012, now Pat. No. 9,020,548.

(51) Int. Cl.
*H04W 72/08*    (2009.01)
*H04W 28/02*    (2009.01)
(Continued)

(52) U.S. Cl.
CPC ........... *H04W 72/082* (2013.01); *H04W 16/10* (2013.01); *H04W 28/0289* (2013.01); *H04W 24/02* (2013.01); *H04W 92/20* (2013.01)

(58) Field of Classification Search
CPC ............... H04W 72/082; H04W 16/10; H04W 28/0289; H04W 24/02; H04W 92/20
See application file for complete search history.

(56) References Cited

U.S. PATENT DOCUMENTS 6,515,970 B1 * 2/2003 Lindsay ................ G10L 19/012
                                                              370/280
7,317,897 B2    1/2008 Braun et al.
(Continued)

FOREIGN PATENT DOCUMENTS

WO    WO 2007/024166    3/2007
WO    2008039123 A1    4/2008
(Continued)

OTHER PUBLICATIONS

3GPP TSG RAN WG1 #50bis meeting; Shanghai, China; Title: Overload Indicator handling for LTE (R1-074349), Oct. 8-12, 2007.
(Continued)

*Primary Examiner* — Gbemileke Onamuti
(74) *Attorney, Agent, or Firm* — Patent Portfolio Builders, PLLC

(57) ABSTRACT

The present disclosure concerns interference congestion control in radio communication networks. Disclosed herein are methods as well radio network nodes. A radio network node may, for example, estimate a neighboring cell interference. The radio network node may also detect a sudden significant increase in the estimated neighboring cell interference. In response to detecting a sudden significant in the estimated neighboring cell interference, the radio network node may also transmit a message to at least one other radio network node. This message may include an indicator indicating to said at least one radio network node to initiate an
(Continued)

interference congestion control procedure. Hereby it is made possible to allow for interference congestion control in radio communication networks.

7 Claims, 10 Drawing Sheets

(51) Int. Cl.
  *H04W 16/10* (2009.01)
  *H04W 24/02* (2009.01)
  *H04W 92/20* (2009.01)

(56) References Cited

U.S. PATENT DOCUMENTS

| | | | |
|---|---|---|---|
| 7,599,331 | B2 | 10/2009 | Hong et al. |
| 7,912,461 | B2 | 3/2011 | Wigren |
| 7,920,517 | B2 | 4/2011 | Bachl et al. |
| 8,676,124 | B2 | 3/2014 | Zhang et al. |
| 8,712,424 | B2 | 4/2014 | Luo et al. |
| 2004/0048587 | A1 | 3/2004 | Diao et al. |
| 2006/0209721 | A1 | 9/2006 | Mese et al. |
| 2007/0105561 | A1 | 5/2007 | Doetsch et al. |
| 2007/0155395 | A1 | 7/2007 | Gopalakrishnan et al. |
| 2007/0177536 | A1 | 8/2007 | Brueck et al. |
| 2010/0135170 | A1 | 6/2010 | Fan et al. |
| 2011/0009070 | A1 | 1/2011 | Wigren |
| 2011/0098014 | A1 | 4/2011 | Martens et al. |
| 2012/0196589 | A1 | 8/2012 | Wigren |
| 2012/0314607 | A1 | 12/2012 | Craig et al. |
| 2014/0112164 | A1 | 4/2014 | Wigren |

FOREIGN PATENT DOCUMENTS

| | | |
|---|---|---|
| WO | 2011119075 A1 | 9/2011 |
| WO | 2013043093 A1 | 3/2013 |
| WO | WO 2013/043093 | 3/2013 |
| WO | WO 2013/055262 | 4/2013 |

OTHER PUBLICATIONS

"Soft Uplink Load Estimation in WCDMA" by Torbjörn Wigren; IEEE Transactions on Vehicular Technology, vol. 58, No. 2, Feb. 2009.

"Heterogeneous LTE Networks and Inter-Cell Interference Coordination" by Pauli et al.; Nomor Research GmbH, Dec. 2010.

3GPP TSG RAN WG1 #50bis meeting; Shanghai, China; Title: Way forward on UL ICIC/Overload Indicator for LTE (R1-074477), Oct. 8-12, 2007.

3GPP TSG RAN WG1 #51; Jeju (KR); Title: Way forward on UL ICIC/Overload Indicator for LTE (RI-075050), Nov. 5-9, 2007.

3GPP TSG RAN WG2 #62bis Meeting; Warsaw, Poland; Title: Measurement Reporting for Inter-cell Interference Coordination (ICIC) (R2-083338), Jun. 30-Jul. 4, 2008.

"Estimation of uplink WCDMA load in a single RBS" by Wigren et al., 2007.

"Recursive Noise Floor Estimation in WCDMA" by Torbjörn Wigren; IEEE Transactions on Vehicular Technology, vol. 59, No. 5, Jun. 2010.

PCT International Search Report for International application No. PCT/SE2013/050252, Jan. 24, 2014.

PCT Written Opinion of the International Searching Authority for International application No. for International application No. PCT/SE2013/050252, Jan. 24, 2014.

EP Search Report for Application No. / Patent No. 13800066.6-1857 / 2856828, Apr. 29, 2015.

"Low Complexity Kalman Filtering for Inter-Cell Interference and Power Based Load Estimation in the WCDMA Uplink" by Wigren, 2011.

Shoarinejad et al. "Integrated Predictive Power Control and Dynamic Channel Assignment in Mobile Radio Systems," IEEE Transactions on Wireless Communications, vol. 2, No. 5, Sep. 2003, pp. 976-988.

Office action in EP application No. 13800066.6 mailed May 20, 2015.

\* cited by examiner

Figure 5D                                Figure 5E

INTERFERENCE CONGESTION CONTROL

PRIORITY

This nonprovisional application is a U.S. National Stage Filing under 35 U.S.C. §371 of International Patent Application Serial No. PCT/SE2013/050252, filed Mar. 14, 2013, and entitled "Interference Congestion Control" and U.S. patent application Ser. No. 13/488,187 filed Jun. 4, 2012.

TECHNICAL FIELD

Embodiments presented herein generally relate to radio communication. More particularly, the embodiments presented herein relate to interference congestion control in radio communication networks.

BACKGROUND

This section is intended to provide a background to the various embodiments of the invention that are described in this disclosure. The description herein may include concepts that could be pursued, but are not necessarily ones that have been previously conceived or pursued. Therefore, unless otherwise indicated herein, what is described in this section is not prior art to the description and/or claims of this disclosure and is not admitted to be prior art by the mere inclusion in this section.

Recently, at least the following trends have emerged in field of radio communication. First, mobile broadband traffic has been exploding in radio communication networks such as Wideband Code Division Multiple Access (WCDMA) networks. A technical consequence of this is a corresponding increase of the interference in these networks, or equivalently, an increase of the load. Second, radio communication networks are becoming more heterogeneous, with macro Radio Base Stations (RBS:s) being supported by micro and pico RBS:s at so-called traffic hot spots. Furthermore, home base stations (e.g., femto RBS:s) are emerging in many networks. This puts increasing demands on inter-cell interference management. A consequence of the above is also a relatively large increase of the number of radio network nodes in radio communication networks. An additional consequence is reduced operator control. There is therefore a trend towards introducing more self-organizing network (SON) functionality in radio communication networks. Such functionality may support interference management by automatic interference threshold setting and adaptation, e.g. for a sub-set of the nodes of the cellular network.

It is foreseen that interference may become an increasingly important challenge to deal with in today's and future radio communication networks as the traffic is increasing. This may for example be the case in heterogeneous networks (also known as HetNets).

1.1. Technical Background 1.1.1. Load Estimation without Neighboring Cell Interference Estimation The following is a discussion on measurement and estimation techniques to measure instantaneous total load on the uplink air interface given in a radio cell of a WCDMA system. In general, a load at the antenna connector is given by noise rise, also referred to as Rise over Thermal, RoT(t), defined by:

$$RoT(t) = \frac{P_{RTWP}(t)}{P_N(t)}, \quad (1)$$

where $P_N(t)$ is the thermal noise level as measured at the antenna connector. For the purposes of discussion, $P_{RTWP}(t)$ may be viewed as the total wideband power defined by:

$$P_{RTWP}(t) = \sum_{i=1}^{I} P_i(t) + P_{other}(t) + P_N(t), \quad (2)$$

also measured at the antenna connector. The total wideband power $P_{RTWP}(t)$, is unaffected by any de-spreading applied. In (2), $P_{other}(t)$ represents the power as received from one or more cells of the WCDMA system other than an own cell. The $P_i(t)$ are the powers of the individual users. A difficulty of any RoT estimation technique is in the inherent inability to separate the thermal noise $P_N(t)$ from the interference $P_{other}(t)$ from other cells.

Another specific challenge that generally needs to be addressed is that the signal reference points are, by definition, at the antenna connectors. The measurements are however obtained after the analog signal conditioning chain, in the digital receiver. The analog signal conditioning chain may introduce a scale factor error of about 1 dB (1-sigma) that is generally difficult to compensate for. Fortunately, all powers of (2) are equally affected by the scale factor error so when (1) is calculated, the scale factor error can be cancelled as follows:

$$RoT^{Digital\ Receiver}(t) = \quad (3)$$

$$\frac{P_{RTWP}^{Digital\ Receiver}(t)}{P_N^{Digital\ Receiver}(t)} = \frac{\gamma(t) P_{RTWP}^{Antenna}(t)}{\gamma(t) P_N^{Antenna}(t)} = RoT^{Antenna}(t).$$

In order to understand the fundamental challenge of interferences from other cells, i.e. neighbor cell interference, when performing load estimation, it should be appreciated that:

$$P_{other}(t) + P_N(t) = E[P_{other}(t)] + E[P_N(t)] + \Delta P_{other}(t) + \Delta P_N(t). \quad (4)$$

where $E[\ ]$ denotes a mathematical expectation and where $\Delta$ denotes a variation around the mean. The fundamental challenge can now be seen. Since there are no measurements available in the RBS that are related to the other cell interference (i.e. the neighbor cell interference), a linear filtering operation can at best estimate the sum $E[P_{other}(t)] + E[P_N(t)]$. This estimate cannot be used to deduce the value of $E[P_N(t)]$. The situation is generally the same as when the sum of two numbers is available. Then there is no way to figure out the individual values of $E[P_{other}(t)]$ and $E[P_N(t)]$. It has also been formally proved that the thermal noise power floor is not mathematically observable.

FIG. 1 illustrates a conventional algorithm that estimates a noise floor. The illustrated algorithm is referred to as a sliding window algorithm, and estimates the RoT as given by equation (1) above. This conventional estimation algorithm can provide an accurate estimation of the thermal noise floor N(t). Since it is generally not possible to obtain exact estimates of this quantity due to the other cell interference (i.e. neighbor cell interference), the estimator therefore applies an approximation, by consideration of a soft minimum as computed over a relative long window in time. It should be appreciated that this estimation relies on the fact that the noise floor is constant over very long periods of time (disregarding the small temperature drift).

A disadvantage of the sliding window algorithm is that the algorithm generally requires a large amount of storage memory. This may become particularly troublesome in case a large number of instances of the algorithm is needed, as may be the case when interference congestion is introduced in the uplink. A recursive algorithm has been introduced to reduce the memory consumption, e.g. as suggested in the U.S. Pat. No. 8,346,177. Relative to the sliding window algorithm, the recursive algorithm can reduce the memory requirement by a factor of more than one hundred.

1.1.2 Load Prediction

The following is a discussion on techniques to predict instantaneous load on the uplink air interface ahead in time. The scheduler uses this functionality. The scheduler tests different combinations of grants to determine the best combinations, e.g., maximizing the throughput. This scheduling decision will only affect the air interface load after a number of TTIs (each such TTI a predetermined time duration such as 2 or 10 ms), due to grant transmission latency and UE latency before the new grant takes effect over the air interface.

In a conventional SIR (signal-to-interference ratio) based method, the prediction of uplink load, for a tentative scheduled set of UEs and grants, is based on the power relation defined by:

$$P_{RTWP}(t) - P_N(t) = \sum_{i=1}^{N} L_i(t) P_{RTWP}(t) + P_{other}(t), \quad (5)$$

where $L_i(t)$ is the load factor of the i-th UE of the own cell. As indicated, $P_{other}(t)$ denotes the other cell interference. The load factors of the own cell are computed as follows. First, note that:

$$(C/I)_i(t) = \frac{P_i(t)}{P_{RTWP}(t) - (1-\alpha)P_i} = \qquad (6)$$

$$\frac{L_i(t) P_{RTWP}(t)}{P_{RTWP}(t) - (1-\alpha)L_i(t)P_{RTWP}(t)} = \frac{L_i(t)}{1-(1-\alpha)L_i(t)}$$

$$\Leftrightarrow$$

$$L_i(t) = \frac{(C/I)_i(t)}{1+(1-\alpha)(C/I)_i(t)},$$

$$i = 1, \ldots, I,$$

where I is the number of UEs in the own cell and a is the self-interference factor. The carrier to interference values, $(C/I)_i(t)$, i=1, ..., I, are then related to the SINR (measured on the DPCCH channel) as follows:

$$(C/I)_i(t) = \qquad (7)$$

$$\frac{SINR_i(t)}{W_i} \frac{RxLoss}{G} \times \left(1 + \frac{\beta_{DPDCH,i}^2(t) + \beta_{EDPCCH,i}^2(t) + n_{codes,i}(t)\beta_{EDPDCH,i}^2(t) + \beta_{HSDPCCH,i}^2(t)}{\beta_{DPCCH}^2(t)}\right),$$

$$i = 1, \ldots, I.$$

In (7), $W_i$ represents the spreading factor, RxLoss represents the missed receiver energy, G represents the diversity gain and the β:s represent the beta factors of the respective channels. Here, inactive channels are assumed to have zero data beta factors.

The UL load prediction then computes the uplink load of the own cell by a calculation of (6) and (7) for each UE of the own cell, followed by a summation:

$$L_{own}(t) = \sum_{i=1}^{I} L_i(t), \qquad (8)$$

which transforms (5) to:

$$P_{RTWP}(t) = L_{own}(t)P_{RTWP}(t) + P_{other}(t) + P_N(t). \qquad (9)$$

Dividing (9) by $P_N(t)$ shows that the RoT can be predicted k TTIs ahead as:

$$RoT(t+kT) = \frac{P_{other}(t)/P_N(t)}{1-L_{own}(t)} + \frac{1}{1-L_{own}(t)}. \qquad (10)$$

In the SIR based load factor calculation, the load factor $L_i(t)$ is defined by (6). However, in a power based load factor calculation, the load factor $L_i(t)$ can be defined by:

$$L_i(t) = \frac{P_i(t)}{P_{RTWP}(t)}, \qquad (11)$$

$$i = 1, \ldots, I,$$

and equations (8)-(10) may be calculated based on the load factor $L_i(t)$ of (11) to predict the RoT k TTIs ahead. An advantage of the power based load factor calculation is that the parameter dependency is reduced. But on the downside, a measurement of the UE power is needed.

1.1.3 Heterogeneous Networks (HetNets)

In heterogeneous networks (HetNets), different kinds of radio cells are generally mixed. A challenge that arises in Hetnets in that the cells are likely to have different radio properties in terms of (among others):

radio sensitivity;
frequency band;
coverage;
output power;
capacity; and
acceptable load level.

This can be an effect of the use of different RBS sizes (macro, micro, pico, femto), different revisions (different receiver technology, software quality), different vendors, the purpose of a specific deployment, and so on. An important factor in HetNets is therefore that of the air interface load management, i.e., the issues associated with the scheduling of radio resources in different cells and the interaction between cells in terms of inter-cell interference.

These issues are exemplified with reference to FIG. 2 which illustrates a low power cell with limited coverage intended to serve a hotspot. To enable sufficient coverage of the hot spot, an interference suppressing receiver like the G-rake+ is used. One challenge is now that the low power cell is located in the interior of and at the boundary of a specific macro cell. Also, surrounding macro cells interfere with the low power cell rendering a high level of other cell interference in the low power cell which, despite the advanced receiver, reduces the coverage to levels that do not allow coverage of the hot spot. As a result, UEs of the hot spot are connected to the surrounding macro cells, which can further increase the other cell interference (i.e. neighbor cell interference) experienced by the low power cell.

SUMMARY

It is in view of the above considerations and others that the various embodiments disclosed herein have been made.

It is a general object to provide for improved interference congestion control. Advantageously, embodiments described in this disclosure should allow for improved interference congestion control in HetNets.

The various embodiments as set forth in the appended independent claims address this general object. The appended dependent claims represent additional advantageous embodiments.

A first non-limiting aspect of the disclosed subject-matter is directed to a method for uplink interference congestion control. The method is performed by a first radio network node serving a cell of interest. The method may comprise estimating a neighboring cell interference, the neighboring cell interference being induced in the cell of interest by wireless activities in at least one other cell which is different from the cell of interest. Also, the method may comprise detecting a sudden significant increase in the estimated neighboring cell interference. In response to detecting the sudden significant increase in the estimated neighboring cell interference, the method may additionally comprise transmitting a message to at least one other radio network node that is serving at least one cell which is different from the cell of interest. This message includes an indicator indicating to said at least one other radio network node to initiate an interference congestion control procedure.

In one embodiment, detecting a sudden significant increase in the estimated neighboring cell interference comprises determining a change in the estimated neighboring cell interference occurring during a first time period; and establishing that the determined change in the estimated neighboring cell interference is above a first threshold value. The first threshold value may be a value, which is positive (i.e. the threshold value has a positive sign). In other words, the first threshold value may be a non-negative value.

The length of the first time period may e.g. be in the range of 10 to 50 milliseconds. That is, the first time period may for example be 10 milliseconds, 15 milliseconds, 20 milliseconds, 25 milliseconds, 30 milliseconds, 35 milliseconds, 40 milliseconds, 45 milliseconds, or 50 milliseconds.

Also, the first threshold value may be in the range of 2-5 decibels (dB). That is, the first threshold value may e.g. be 2 dB, 2.5 dB, 3 dB, 3.5 dB, 4 dB, 4.5 dB, or 5 dB.

In another embodiment, detecting a sudden significant increase in the estimated neighboring cell interference may comprise detecting whether an increase of a neighboring cell interference has occurred during a first time period, and also determining that a sudden significant increase in the estimated neighboring cell interference has occurred when said increase of the neighboring cell interference is above a first threshold.

The length of the first time period may e.g. be in the range of 10 to 50 milliseconds. That is, the first time period may for example be 10 milliseconds, 15 milliseconds, 20 milliseconds, 25 milliseconds, 30 milliseconds, 35 milliseconds, 40 milliseconds, 45 milliseconds, or 50 milliseconds.

Also, the first threshold value may be in the range of 2-5 decibels (dB). That is, the first threshold value may e.g. be 2 dB, 2.5 dB, 3 dB, 3.5 dB, 4 dB, 4.5 dB, or 5 dB.

Advantageously, estimating the neighboring cell interference may be performed in accordance with the unpublished U.S. patent application Ser. No. 13/488,187, which was filed on Jun. 4, 2012. The unpublished US patent application is incorporated herein by reference to Appendix A. For example, estimating the neighbor cell interference may thus comprise estimating a load utilization probability $p_{load}(t_1)$ based at least on a load utilization probability estimate $\hat{p}_{load}(t_0)$ and an interference-and-noise sum estimate $\hat{P}_{other}(t_0)+\hat{P}_N(t_0)$ applicable at a time $t_0$ to obtain a load utilization probability estimate $\hat{p}_{load}(t_1)$ applicable at a time $t_1$, wherein $t_1-t_0=T>0$. The method may also comprise estimating an interference-and-noise sum $P_{other}(t_1)+P_N(t_1)$ based at least on the load utilization probability estimate $\hat{p}_{load}(t_0)$ and the interference-and-noise sum estimate $\hat{P}_{other}(t_0)+\hat{P}_N(t_0)$ to obtain an interference-and-noise sum estimate $\hat{P}_{other}(t_1)+\hat{P}_N(t_1)$ applicable at the time $t_1$. The method may further comprise estimating an neighbor cell interference $P_{other}(t_1)$ based at least on the interference-and-noise sum estimate $\hat{P}_{other}(t_1)+\hat{P}_N(t_1)$ and a thermal noise estimate $\hat{P}_N(t_1)$ to obtain a neighbor cell interference estimate $\hat{P}_{other}(t_1)$ applicable at the time $t_1$.

The load utilization probability $p_{load}(t)$ may express a relationship between radio resource grants scheduled to one or more user equipments, UEs, and radio resource grants used by the same UEs applicable at a time t. Each UE may be a UE in the cell of interest, and the load utilization probability estimate $\hat{p}_{load}(t)$ may express an estimate of the load utilization $p_{load}(t)$. Furthermore, the interference-and-noise sum $P_{other}(t)+P_N(t)$ may express a sum of undesired signals, other than an own cell load $P_{own}(t)$ applicable at the time t, and the interference-and-noise sum estimate $\hat{P}_{other}(t)+\hat{P}_N(t)$ being an estimate thereof. Also, the own cell load $P_{own}(t)$ may express a sum of signals due to wireless activities in the cell of interest applicable at the time t. Moreover, the neighbor cell interference $P_{other}(t)$ may express a sum of interferences present in the cell of interest due to wireless activities applicable at the time t in one or more cells other than in the cell of interest, and the neighbor cell interference estimate $\hat{P}_{other}(t)$ being an estimate thereof. Still further, a thermal noise $P_N(t)$ may express a sum of undesired signals present in the cell of interest at the time t other than the own cell load $P_{own}(t)$ and other than the neighbor cell interference $P_{other}(t)$, and the thermal noise estimate $\hat{P}_N(t)$ being an estimate thereof.

In one embodiment, the method may additionally comprise comparing the estimated neighboring cell interference with a second threshold value. If so, detecting the sudden significant increase in the estimated neighboring cell interference may be performed only in response to the estimated neighboring cell interference being above the second threshold value. The second threshold value may e.g. be in the range of 2-4 decibel over a thermal noise power floor value, i.e. for example 2, 2.5, 3, 3.5 or 4 dB over the thermal noise power floor value.

A second non-limiting aspect of the disclosed subject-matter is also directed to a method for uplink interference congestion control. The method is performed by a second radio network node. The method may comprise receiving, from a first radio network node, a message including an indicator indicating to the second radio network node to initiate an interference congestion control procedure. In response to receiving said message, the method may also comprise analyzing a scheduling of one or more user equipments, UEs, to determine a likelihood that the second radio network node caused a sudden significant increase in an estimated neighboring cell interference. Furthermore, the method may comprise controlling uplink interference congestion in dependence of the determined likelihood that the second radio network node caused the sudden significant increase in the estimated neighboring cell interference.

In one embodiment, analyzing the scheduling of the one or more UEs may comprise: reading a history of uplink, UL, grants for said one or more UEs from a memory of the second radio network node, wherein the history of UL grants includes information on the amount of UL grants scheduled during a second time period; analyzing the history of UL grants to determine whether an increase of the amount of scheduled UL grants has occurred during said second time period; if it is determined that an increase of the amount of UL grants has occurred during said second time period comparing the detected increase of the amount of scheduled UL grants with a third threshold value. The controlling of the UL interference congestion may be performed if the detected increase of the amount of UL grants is above the third threshold value.

The length of the second time period may be in the range of 10 to 80 milliseconds. That is, the length of the second time period may e.g. be 10, 15, 20, 25, 30, 35, 40, 45, 50, 55, 60, 65, 70, 75 or 80 milliseconds.

Also, the third threshold value may be a value which is in the range of 30-60 percent of the maximum amount of scheduled UL grants that can be assigned by the second radio network node.

In another embodiment, analyzing the scheduling of the one or more UEs may comprise reading a history of transmit powers of said one or more UEs from a memory of the second radio network node, wherein the history of transmit powers includes information on the transmit powers of said one or more UEs during a third time period; analyzing the history of transmit powers to determine whether an increase of transmit powers has occurred during said third time period; if it is determined that an increase of the transmit powers has occurred during said third time period furthermore comparing the detected increase of the transmit powers with a fourth threshold value. The controlling of the UL interference congestion may be performed if the detected increase of the transmit powers is above the fourth threshold.

The length of the third time period may be in the range of 10 to 80 milliseconds. That is, the length of the second time period may e.g. be 10, 15, 20, 25, 30, 35, 40, 45, 50, 55, 60, 65, 70, 75 or 80 milliseconds.

Also, the fourth threshold value is a value which is in the range of 5-15 decibel. For example, the fourth threshold value may be 5, 10 or 15 db.

In some embodiments, controlling the UL interference congestion may comprise transmitting a message to one or more UEs, wherein said message comprises an information element including a request to the one or more UEs to decrease the allowable UL data rate.

In some embodiments, controlling the UL interference congestion may additionally, or alternatively, comprise transmitting a message to one or more UEs, wherein said message comprises an information element including a request to the one or more UEs to reduce the transmission power.

A third non-limiting aspect of the disclosed subject-matter is directed to a first radio network node for uplink interference congestion control. The first radio network node may comprise a transceiver configured to transmit and receive messages to and from at least one other radio network node configured to serve at least one other cell which is different from the cell of interest. Also, a scheduler may be configured to schedule uplink transmissions from at least one user equipment, UE. The scheduler may further be configured to: estimate a neighboring cell interference, the neighboring cell interference being induced in the cell of interest by wireless activities in at least one other cell which is different from the cell of interest; and detect a sudden significant increase in the estimated neighboring cell interference. Moreover, the transceiver may be configured to, in response to detecting the sudden significant increase in the estimated neighboring cell interference, transmit a message to at least one other radio network node that is serving at least one cell which is different from the cell of interest. This message may include an indicator indicating to said at least one radio network node to initiate an interference congestion control procedure.

A fourth non-limiting aspect of the disclosed subject-matter is directed to a second radio network node for uplink interference congestion control. The second radio network node may comprise a first transceiver configured to transmit and receive messages to and from one or more user equipments, UEs. A second transceiver is configured to transmit and receive messages to and from at least one other radio network node, wherein the second transceiver is also configured to receive a message from said at least one other radio network node wherein said message includes an indicator indicating to the second radio network node to initiate an interference congestion control procedure. Furthermore, a scheduler is configured to schedule uplink transmissions from the UEs. The scheduler is also configured to, in response to the second transceiver receiving said message, analyze the scheduling of one or more user equipments, UEs, to determine a likelihood that the second radio network node caused a sudden significant increase in an estimated neighboring cell interference. The scheduler is also configured to control uplink interference congestion in dependence of the determined likelihood that the second radio network node caused the sudden significant increase in the estimated neighboring cell interference.

A fifth non-limiting aspect of the disclosed subject matter is directed to a computer-readable medium which has stored therein programming instructions. When a computer executes the programming instructions, the computer executes the method of the herein described first aspect.

A sixth non-limiting aspect of the disclosed subject matter is directed to a computer-readable medium which has stored therein programming instructions. When a computer executes the programming instructions, the computer executes the method of the herein described second aspect.

BRIEF DESCRIPTION OF THE DRAWINGS

These and other aspects, features and advantages will be apparent and elucidated from the following description of various embodiments, reference being made to the accompanying drawings, in which.

DETAILED DESCRIPTION

Figure 1:
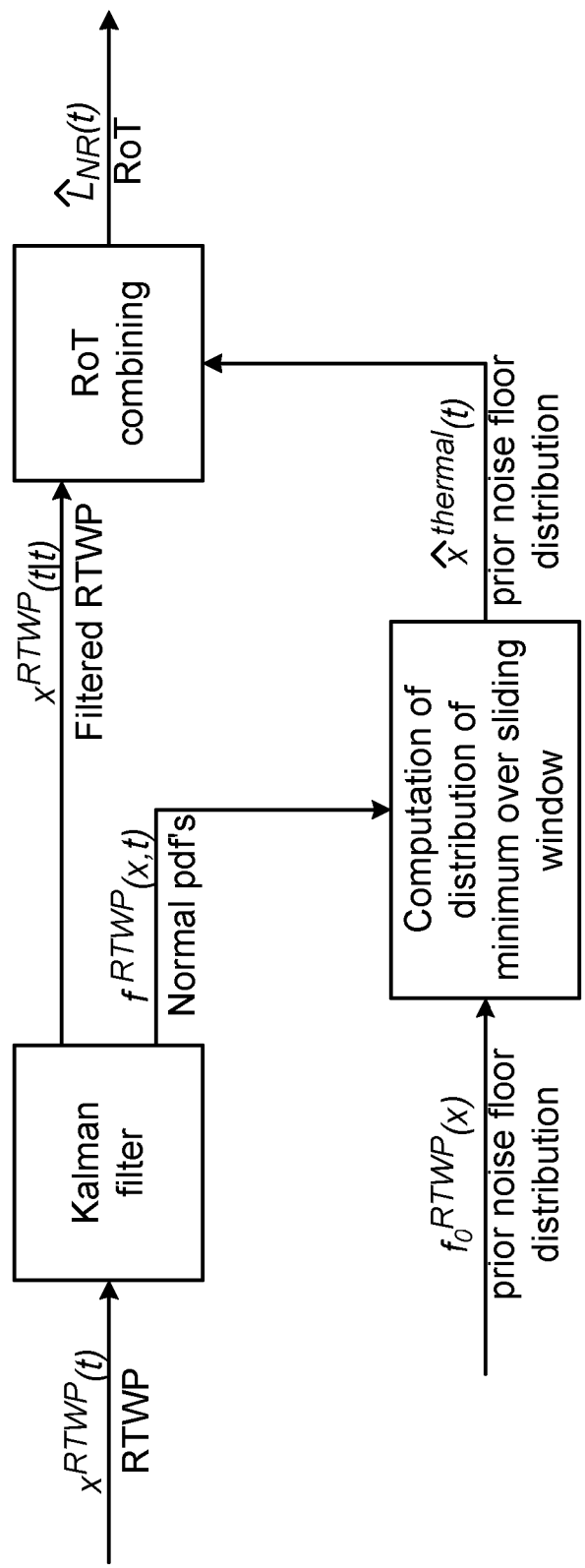
FIG. 1 illustrates a conventional algorithm that estimates a noise floor.
Figure 2:
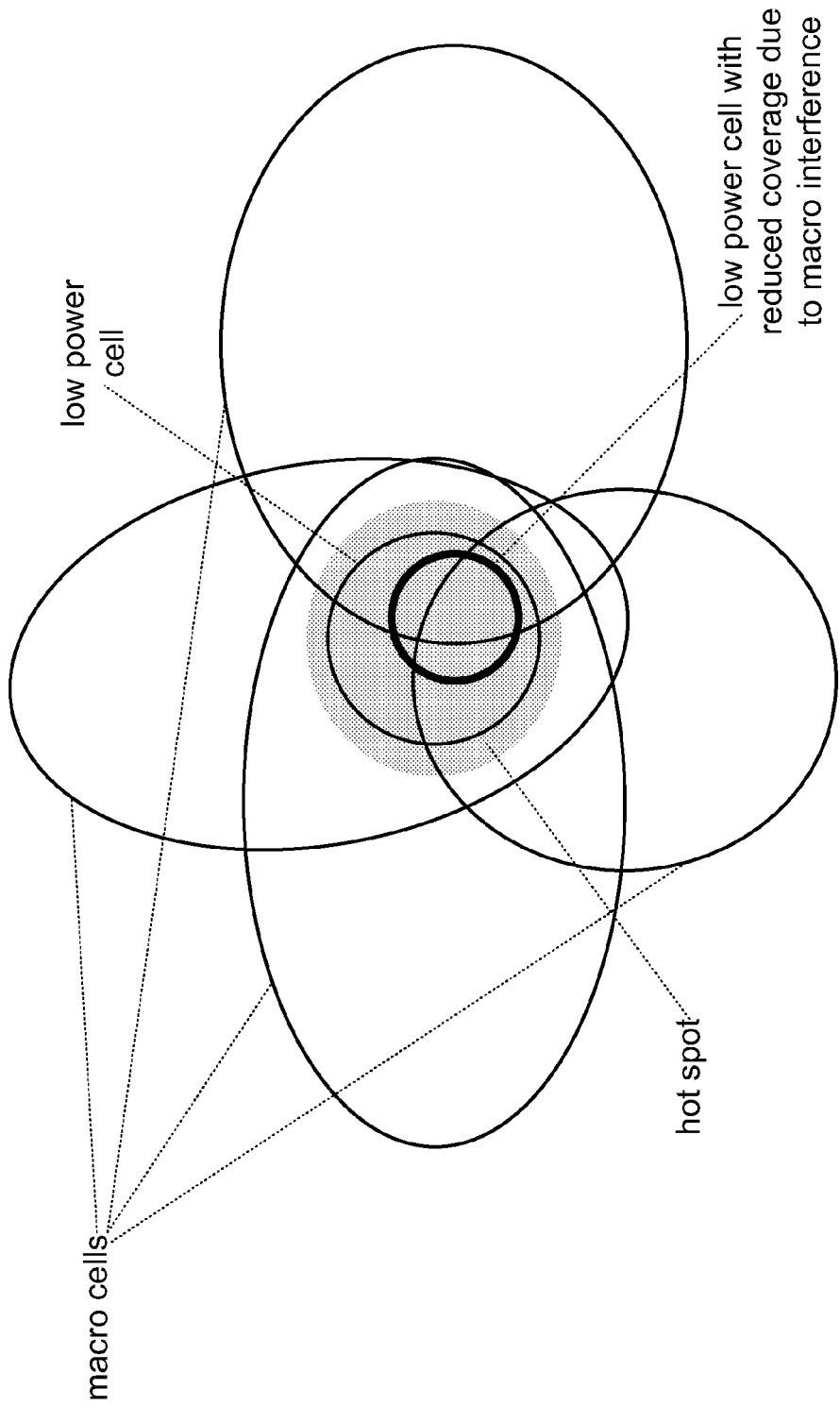
FIG. 2 illustrates an example scenario of a low power cell with limited coverage intended to serve a hotspot.

The invention will now be described more fully hereinafter with reference to the accompanying drawings, in which certain embodiments are shown. The invention may, however, be embodied in many different forms and should not be construed as limited to the embodiments set forth herein; rather, these embodiments are provided by way of example so that this disclosure will be thorough and complete, and will fully convey the scope of the invention to those persons skilled in the art. Like reference numbers refer to like elements or method steps throughout the description.

In this disclosure, 3GPP technologies (e.g. WCDMA) are used as example technologies for explanation purposes. It should however be appreciated that the technology described herein could be applied in non-3GPP technologies as well, e.g. WiMax, etc. Thus, the scope of this disclosure should not be interpreted as being limited to 3GPP technologies such as WCDMA. Also, as used in this disclosure, the term "user equipment (UE)" is used to mean any device, which can be used by a user to communicate. Also, the term UE may be referred to as a mobile terminal, a terminal, a user terminal (UT), a wireless terminal, a wireless communication device, a wireless transmit/receive unit (WTRU), a mobile phone, a cell phone, etc. Yet further, the term UE includes MTC (Machine Type Communication) devices, which do not necessarily involve human interaction. Also, the term "radio network node" as used herein generally denotes a point (e.g. a fixed point) being capable of communicating with the UE. As such, it may be referred to as a base station, a radio base station, a NodeB or an evolved NodeB (eNB), access point, relay node, etcetera.

As indicated hereinabove, a potential disadvantage of many conventional RoT(t) estimation techniques lies in the difficulty in separating the thermal noise $P_N(t)$ from the interference $P_{other}(t)$ from other cells, i.e. neighboring cells. This generally makes it difficult to estimate the RoT(t), i.e., it is generally difficult to estimate the load as given in equation (1). The other cell interference $P_{other}(t)$ in this context may be viewed as a sum of interferences present in a cell of interest due to wireless activities applicable at time t in one or more cells other than in the cell of interest. Therefore, as used throughout this disclosure (including Appendix A) will sometimes also be referred to as "neighbor cell interference" or "neighboring cell interference". In one or more aspects, the determination of the neighbor cell interference $P_{other}(t)$ involves estimating the neighbor cell interference. For the purposes of this disclosure, estimations of parameters are indicated with a "^" (caret) character. For example, $\hat{P}_{other}(t)$ may be read as an estimate of the other cell interference $P_{other}(t)$, i.e. the neighbor cell interference $P_{other}(t)$.

There exist known techniques to determine the neighbor cell interference estimate $\hat{P}_{other}(t)$. These conventional techniques generally assume that the powers of all radio links are measured in the uplink receiver. This assumption may not necessarily be true in all instances today. The power measurement is associated with difficulties since, e.g.:

In WCDMA for example, the uplink transmission is not necessarily orthogonal, which can cause errors when the powers are estimated; and The individual code powers are often small, making the SNRs (signal-to noise ratio) low as well. This further contributes to a potential inaccuracy of the power estimates.

One challenge associated with the conventional neighbor cell interference estimation techniques is that the sum of other cell interference and thermal noise $P_{other}(t)+P_N(t)$ (referred to as the interference-and-noise sum) generally need to be estimated through high order Kalman filtering. The primary reason for this is that all powers of the UEs need to be separately filtered using at least one Kalman filter state per UE when such techniques are used. This step is consequently associated with a relatively high computational complexity. There exist techniques that can reduce this computational complexity, but the complexity may be still too high when the number of UEs increases. In these conventional solutions, the thermal noise floor N(t) is estimated as described above, i.e., $\hat{N}(t)$ is determined followed by a subtraction to arrive at an estimate of the other cell interference $\hat{P}_{other}(t)$.

In the existing solutions, the EUL (Enhanced Uplink) utilizes a scheduler that aims to fill the load headroom of the air interface, so that the different UE requests for bitrates are met. As stated above, the air-interface load in WCDMA is determined in terms of the noise rise over the thermal power level, i.e., the RoT(t), which is estimated at the base station.

Regarding HetNets in particular, challenges associated with conventional scheduling techniques can be explained in a relatively straightforward manner. For scheduling in the radio network node in general, existing known techniques require measurement of all UE powers in the UL. This may be costly computationally, requiring Kalman filters of high order for processing the measurements to obtain estimates of the neighboring cell interference power. This is because each own cell UE adds a state to the Kalman filter. The consequence, if such estimation cannot be done, is that the scheduler is generally unaware of the origin of the interference, thereby making it more difficult to arrive at good scheduling decisions. For HetNets, the problem is again that there is no information of the origin of interference, and interference variance, for adjacent (e.g. neighboring) cells. This is primarily due to the lack of low complexity estimators for these quantities. Consequently, in HetNets where it is foreseen that interference may become an increasingly important challenge, there is a need to allow for improved, or alternative, ways of controlling interference congestion.

Each of one or more aspects of the disclosed subject matter addresses one or more of the issues related to conventional techniques.

Figure 3:
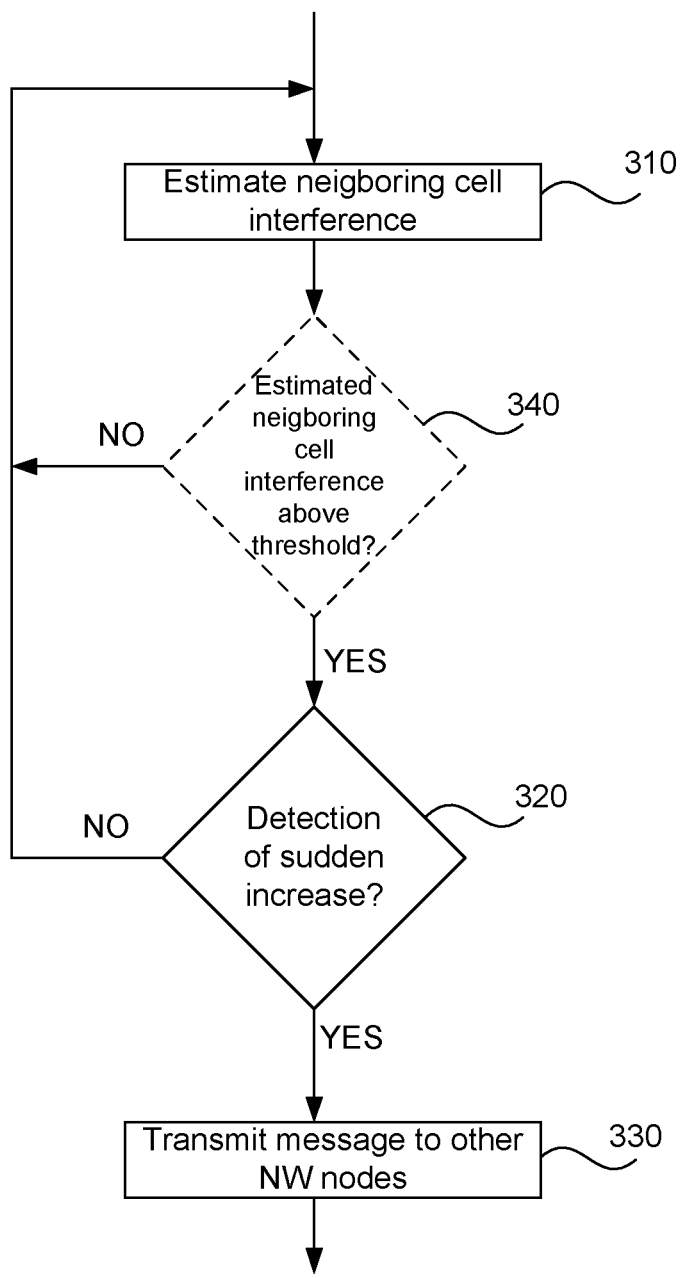
FIG. 3 shows a flowchart of a method according to an embodiment performed in a first radio network node.

With reference to FIG. 3, an example embodiment of a method for uplink interference congestion control is shown. The method may be performed by, or otherwise implemented in, a first radio network node serving a cell of interest.

As illustrated, in step 310, neighboring cell interference is estimated. The neighboring cell interference is induced in the cell of interest (i.e. the radio cell controlled by the first radio network node) by wireless activities in one or several other cells, which are different from the cell of interest.

Estimating neighbor cell interference can be performed in various ways. For the purpose of this disclosure but without limitation, techniques for estimating neighbor cell interference may advantageously have the following characteristics:

Perform measurements of the received UL total wideband power (RTWP);

Perform measurements of the load utilization of the UL, or alternatively, the actual used load factor;

Estimate at least the neighboring cell interference power and the load utilization probability The RTWP measurement has been explained in the background section as has the concepts of own and neighbor cell interference power. To explain the load utilization concept, it is noted that in WCDMA EUL (Enhanced Uplink) the scheduler gives grants to UEs. These grants give the UEs the right to transmit with a certain rate and power. The UE does however not have to use the grants. This freedom of the UE may create challenges for the estimation of uplink load. The reason is that in practice, field trials reveal a load utilization that is sometimes less than 25%. Unless accounted for, the scheduler may believe that the load is then much higher than it actually is. The result of this is that the scheduler stops granting too early, resulting in under-utilization of the UL. Such waste is not desirable.

Therefore, it is instead proposed to account for the measured utilization in the estimation of interference powers, like neighbor cell interference. This can be done as explained in the unpublished U.S. patent application Ser. No. 13/488,187, incorporated herein by reference to Appendix A. In U.S. patent application Ser. No. 13/488,187, the estimated neighbor cell interference is made dependent on an additional estimate of the load utilization. This estimate may be supported by a measurement relatively closely related to the estimated load utilization. This way, the accuracy of the neighbor cell interference power estimate can be improved. Secondly, the availability of these measurements at TTI (Transmission-Time-Interval) rate, together with the improved accuracy of the estimates, may allow for a relatively high bandwidth of the estimates. Since the estimates are generally more accurate, less filtering is needed for, e.g., smoothing and noise suppression, which in turn may enhance the bandwidth.

Estimating 310 the neighboring cell interference may, thus, advantageously (but not necessarily) be performed in accordance with one or more of the embodiments disclosed in U.S. patent application Ser. No. 13/488,187, see Appendix A. Since these embodiments are detailed in Appendix A, these embodiments will not be further detailed here.

With further reference to FIG. 3, the method may also comprise detecting 320 a sudden significant increase in the estimated neighboring cell interference as is illustrated in FIG. 3. If no sudden increase is detected in step 320, the first radio network node may continue estimating the neighboring cell interference. This can be done at regular intervals or continuously. However, in response to detecting 320 a sudden significant increase in the estimated neighboring cell interference, a message is transmitted (i.e. sent) 330 to one or more neighboring radio network nodes that are serving other cells, i.e. cells that are different from the cell of interest served by the first radio network node. The message includes an indicator that indicates (to said other radio network nodes) to initiate an interference congestion control procedure.

Figure 4A:
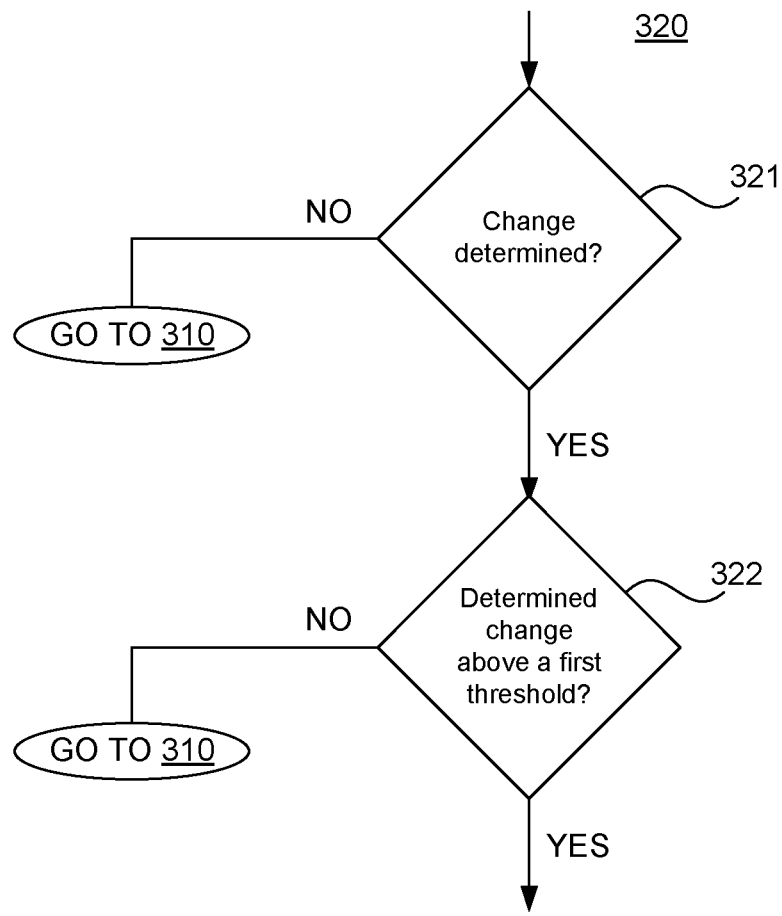
FIG. 4 shows flowcharts of example methods for detecting a sudden increase of a neighboring cell interference.
Figure 4B:
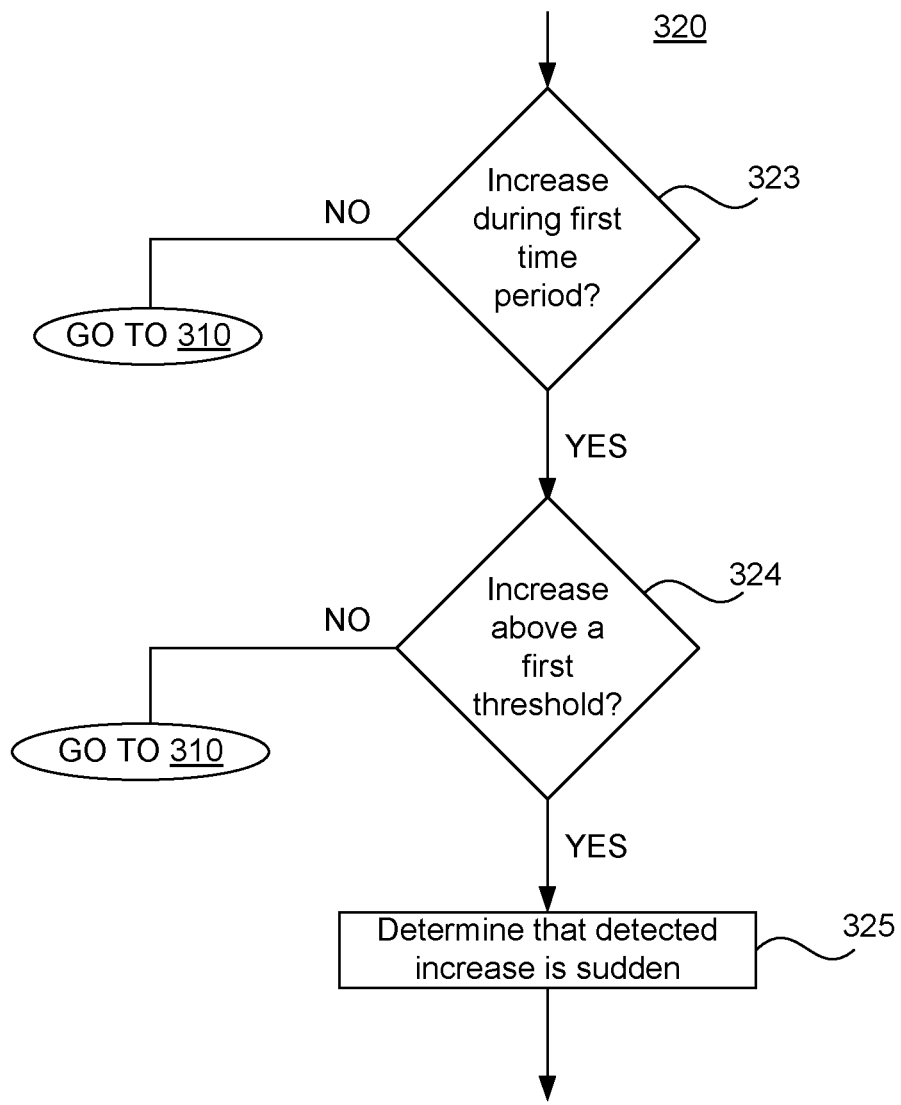

With reference to FIGS. 4A and 4B, two example embodiments of detecting 320 a sudden significant increase in the estimated neighboring cell interference will be described in more detail. Turning first to FIG. 4A, in a first step 321, it can be determined whether a change in the estimated neighboring cell interference occurs during a first time period. If a change in the estimated neighboring cell interference is determined 321, or detected, the method continues to step 322. In step 322, it is established whether or not the determined change is above a first threshold value. The first threshold value may be a value, which is positive (i.e. the threshold value has a positive sign). In other words, the first threshold value may be a non-negative value. Consequently, if a change occurs during the first time period and if this change is also above a certain first threshold value then it can be determined, or concluded, that a sudden increase of the neighboring cell interference has occurred.

To this end, it should be appreciated that the exact values of the first time period and the first threshold value should be evaluated and tested in each specific case such that suitable values are selected depending on specific needs, e.g. needs regarding desired performance, etc. Important here is to select values that are suitable for determining that a detected increase of the estimated neighboring cell interference is sudden. As a mere example, the first time period may be selected to be 30 milliseconds and the first threshold may be selected to be 3 dB. Other combinations of values for the first time period and the first threshold are of course also conceivable. It is proposed that the first time period has a length that is 10, 15, 20, 25, 30, 35, 40, 45 or 50 milliseconds. Also, it is advantageous that the first threshold is 2, 2.5, 3, 3.5, 4, 4.5 or 5 dB.

Turning now to the alternative embodiment illustrated in FIG. 4B, in a first step 323, it is detected whether an increase of neighboring cell interference has occurred during a first time period. Subsequently, in step 325, it is determined, or concluded, that a sudden significant increase in the estimated neighboring cell interference has occurred when it has been determined (or, detected), in step 324, that said increase of the neighboring cell interference is above a first threshold. In other words, if an increase occurs during the first time period and if this increase is also above a certain first threshold then it can be determined, or concluded, that a sudden increase of the neighboring cell interference has occurred. Again, it should be appreciated that the exact values of the first time period and the first threshold value should be evaluated and tested in each specific case such that suitable values are selected depending on specific needs, e.g. needs regarding desired performance, etc. Important here is to select values that are suitable for determining that a detected increase of the estimated neighboring cell interference is sudden. As a mere example, the first time period may be selected to be 30 milliseconds and the first threshold may be selected to be 3 dB. In other words, if an increase of neighboring cell interference is detected during a first time period of 30 milliseconds (in step 323) and if it is determined that this increase is above 3 dB (in step 324), then it is determined that the increase of the neighboring cell interference is sudden. Other combinations of values for the first time period and the first threshold are of course also conceivable. It is proposed that the first time period has a length that is 10, 15, 20, 25, 30, 35, 40, 45 or 50 milliseconds. Also, it is advantageous that the first threshold is 2, 2.5, 3, 3.5, 4, 4.5 or 5 dB.

According to yet another example embodiment, the following equation can be used for detecting whether an increase in the estimated neighboring cell interference is sudden:

$$\hat{P}_{neighbor}(t|t) - \hat{P}_{neighbor}(t-\Delta t|t-\Delta t) > \text{threshold}_1 \qquad (12)$$

where the time period $\Delta t$ fulfils $\Delta t > 0$.

Figure 5A:
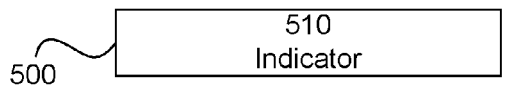
FIG. 5 illustrates various message formats that may be used in signals or data messages, which are signaled when executing methods according to the various embodiments disclosed herein.

Turning back to FIG. 3, in response to detecting 320 a sudden significant increase in the estimated neighboring cell interference, a message can be transmitted, in step 330, to one or more neighboring radio network nodes that are serving other, neighboring, cells. With reference to FIG. 5, various possible message formats of the message are schematically illustrated. In one embodiment as illustrated in FIG. 5A, the message 500 comprises and indicator 510, which is used to indicate (to receiving radio network nodes) that the receiving radio network node(s) should initiate an interference congestion control procedure. This interference congestion control procedure will be further detailed hereinbelow.

Figure 5B:
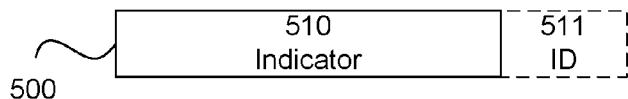

FIG. 5B illustrates an alternative message format, or structure. In this embodiment, the message 500 additionally comprises one information element 510 comprising the indicator and another, additional, information element 511 comprising an identification (ID) of the cell of interest, i.e. the radio cell served by the first radio network node.

Figure 5C:
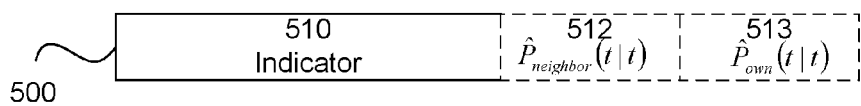
Figure 5C:
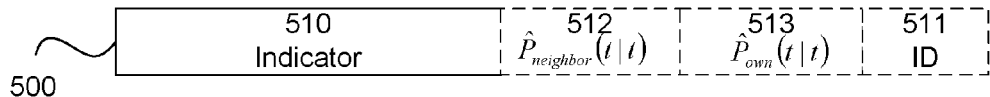
Figure 5F:
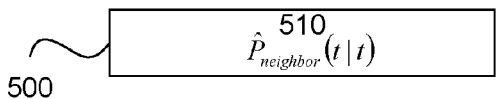
Figure 5F:
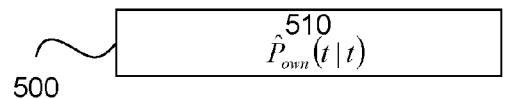
Figure 5F:
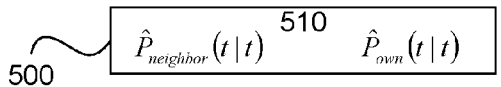

FIG. 5C illustrates another alternative message format, or structure. In this embodiment, the message 500 optionally comprises any one or both of information elements 512 and 513. In this example, the information element 512 comprises information about $P_{neighbor}(t|t)$ and the information element 513 comprises information about $\hat{P}_{own}(t|t)$.

FIG. 5D illustrates yet another alternative message format, which embodies a combination of the message formats shown in FIGS. 5B and 5C.

In still further embodiments, it is not necessary to utilize an explicit indicator 510. Instead, the indicator 510 may be either of or both of $\hat{P}_{neighbor}(t|t)$ and $\hat{P}_{own}(t|t)$, see FIGS. 5E-5G. The messages illustrated in FIGS. 5E-5G may optionally also comprise an information element 511 (nor shown) including the above-mentioned ID of the cell of interest.

In one embodiment, the method may optionally comprise an additional step 340. In optional step 340, an estimated neighboring cell interference is compared with a second threshold value. In such embodiment, the detection 320 is only performed if, or when, the estimated neighboring cell interference is above the second threshold value. The second threshold value may e.g. be in the range of 2-4 decibel over a thermal noise power floor value, i.e. for example 2, 2.5, 3, 3.5 or 4 dB over the thermal noise power floor value.

Figure 6:
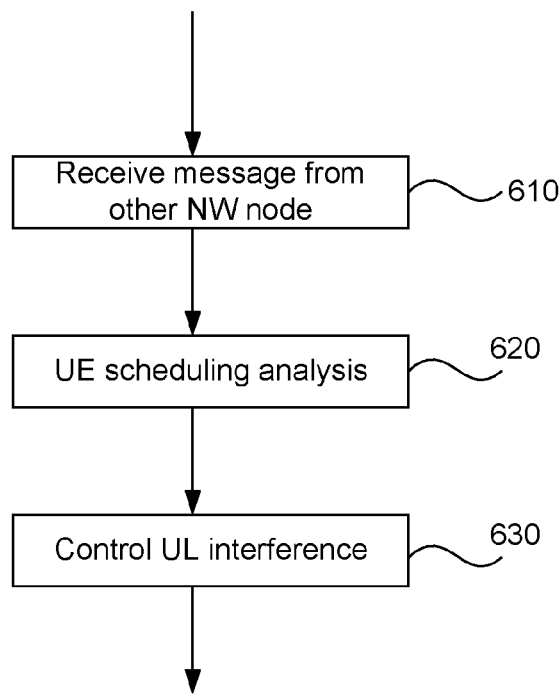
FIG. 6 shows a flowchart of a method according to an embodiment performed in a second radio network node.

Turning now to FIG. 6, an example embodiment of a method for uplink interference congestion control is shown. The method may be performed by, or otherwise implemented in, a second radio network node. In step 610, a message 500 (see FIG. 5) is received from a first radio network node. This message 500 comprises at least an indicator indicating to the second radio network node that it should initiate an interference congestion control procedure. In other words, the second radio network node can be said to be informed, by the first radio network node, that the first radio network node has experienced or otherwise detected a sudden significant increase in its neighbor cell interference. However, the first radio network node cannot, generally, conclude which neighboring cell that is contributing to this sudden significant increase of its experienced neighbor cell interference. Therefore, the first radio network node broadcasts, or signals, the message 500 to one or several surrounding second radio network nodes, thereby requesting these second radio network nodes to initiate an interference congestion control procedure.

In response to receiving a message 500, the second radio network node may analyze 620 the scheduling of one or UEs to determine a likelihood that this second radio network node caused the sudden increase in the estimated neighboring cell interference.

Depending on the determined likelihood that the second radio network node caused the sudden increase in the estimated neighboring cell interference, the second radio network node may or may not take measures for controlling 630 any interference caused by the second radio network node. That is, any uplink interference congestion can be controlled 630 in dependence of the determined likelihood that the second radio network node caused the sudden significant increase in the estimated neighboring cell interference. For example, if it is determined that there is a high likelihood that the second radio network node caused the sudden, potentially also significant, increase in estimated neighbor cell interference experienced by the first radio network node, then the second radio network node will initiate a interference congestion control procedure, thus, controlling the UL interference congestion. On the other hand, if it is determined that there is a low likelihood that the second radio network node caused the sudden, potentially also significant, increase in estimated neighbor cell interference experienced by the first radio network node, then the second radio network node does not have to initiate any interference congestion control procedure.

Figure 7:
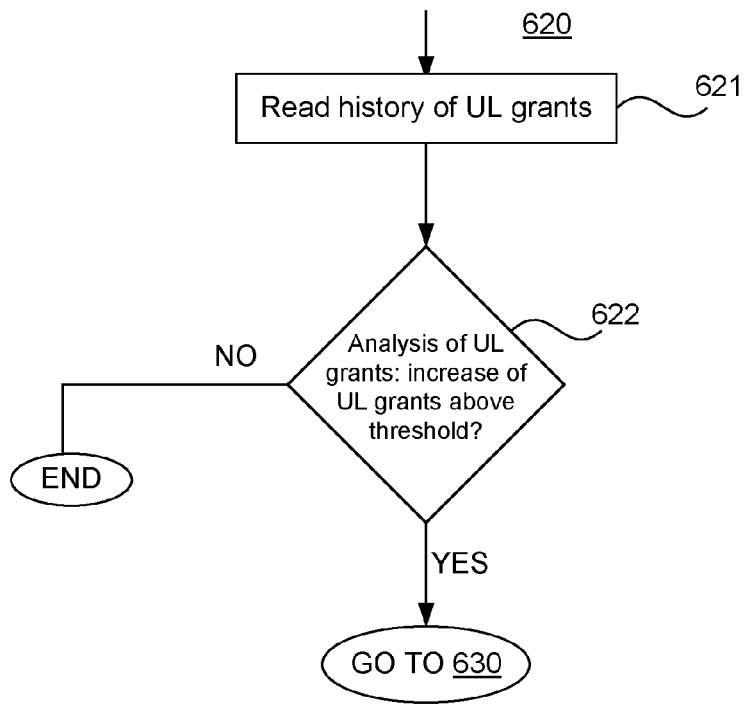
FIG. 7 shows a flowchart of an example method of performing UE scheduling analysis.

There exist various ways of performing the UE scheduling analysis 620. FIG. 7 shows a first example process of UE scheduling analysis 620. In step 621, the second radio network node may read a history of uplink, UL, grants for one or more UEs. This information, i.e. the history of UL grants, may e.g. be read or otherwise retrieved from a memory of the second radio network node. Generally speaking, the history of UL grants includes information, or data, relating to the amount of UL grants that have been scheduled by the second radio network node during a second time period. It is readily understood that the second radio network node should advantageously read the history of UL grants during a second time period which corresponds to the first time period when the first radio network node experienced the sudden significant increase of increased interference. For example, the absolute length of this second time period may be 10-50 milliseconds (e.g. 10, 20, 30, 40 or 50 milliseconds). That is, the second time period may advantageously correspond (in length) to the earlier-mentioned first time period. As will be readily understood, there is typically a delay in the signaling between the first and the second radio network nodes. This delay is typically around 0-30 milliseconds. Therefore, it should also be appreciated that it may be advantageous to set the starting time of the second time period such that any such delay is compensated for.

Subsequently, the history of UL grants can be analyzed 622 to determine whether an increase of the amount of scheduled UL grants has occurred during the above-mentioned second time period. If it is determined that an increase of the amount of UL grants has occurred during said second time period, this detected increase of the amount of scheduled UL grants is compared with a third threshold value. The third threshold value should be evaluated and tested in each specific case such that a suitable value is selected depending on specific needs, e.g. needs regarding desired performance, etc. For example, the third threshold value may be a value which is in the range of 30-60 percent of the maximum amount of scheduled UL grants that can be assigned by the second radio network node.

If, or when, a detected increase of the amount of UL grants is determined to be above the third threshold value, the method continues to step 630 (see FIG. 6) where the second radio network node controls the UL interference congestion.

Figure 8:
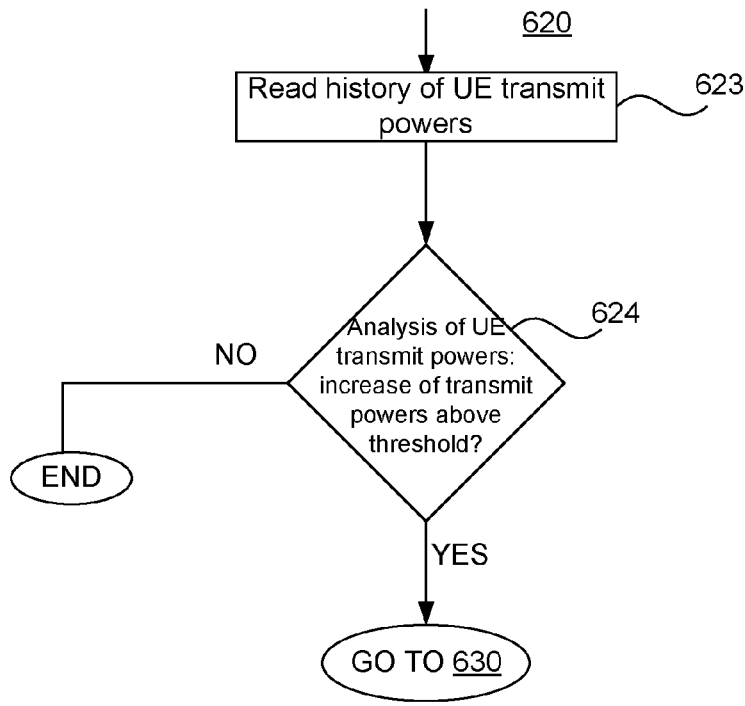
FIG. 8 shows a flowchart of an example method of performing UE scheduling analysis.

FIG. 8 shows another example process of a UE scheduling analysis 620. In step 623, the second radio network node may read a history of transmit powers of one or more UEs. The history may be read or otherwise retrieved from a memory of the second radio network node. The history of transmit powers includes information, or data, on the transmit powers of said one or more UEs during a third time period. It is readily understood that the second radio network node should advantageously read the history of transmit powers during a second time period which corresponds to the first time period when the first radio network node experienced the sudden significant increase of increased interference. For example, the absolute length of this second time period may be 10-50 milliseconds (e.g. 10, 20, 30, 40 or 50 milliseconds). That is, the second time period may advantageously correspond (in length) to the earlier-mentioned first time period. As will be readily understood, there is typically a delay in the signaling between the first and the second radio network nodes. This delay is typically around 0-30 milliseconds. Therefore, it should also be appreciated that it may be advantageous to set the starting time of the second time period such that any such delay is compensated for.

Subsequently, the history of transmit powers can be analyzed 624 to determine whether an increase of transmit powers has occurred during said third time period. If it is determined that an increase of the transmit powers has occurred during said third time period, this increase of transmit powers is compared with a fourth threshold value. For example, the fourth threshold value may be a value which is in the range of 5-15 dB.

If, or when, if it is determined that an increase of the transmit powers is above the fourth threshold value, the method continues to step 630 (see FIG. 6) where the second radio network node controls the UL interference congestion.

Figure 9:
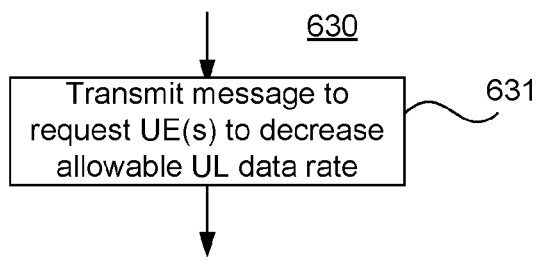
FIG. 9 shows a flowchart of a method for interference control.
Figure 10:
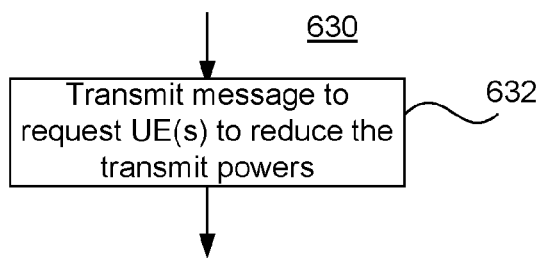
FIG. 10 shows a flowchart of a method for interference control.

Turning back to FIG. 6, there are also various ways of performing the control of the UL interference congestion 630. In one embodiment, which is illustrated in FIG. 9, the second radio network node transmits 631 a message to one or more UEs, wherein said message comprises an information element including a request to the one or more UEs to decrease the allowable UL data rate. In another embodiment, which is illustrated in FIG. 10, the second radio network transmits 632 a message to one or more UEs, wherein said message comprises an information element including a request to the one or more UEs to reduce the transmission power. These two example procedures, i.e. FIGS. 9 and 10, can also be combined. By performing the control of the UL interference congestion, those second radio network node(s) that have determined that there is a relatively high likelihood that these second radio network node(s) caused the sudden increase in the neighbor cell interference (experienced by the first radio network node) can take appropriate measures in an attempt to reduce its/their impact of the interference congestion. By controlling of the UL interference congestion in this way, the impact of those second radio network node(s) that most likely caused the sudden significant increase in interference can reduce the impact of the interference and, hence, the first radio network node may eventually experience a normal interference level again.

The various embodiments described hereinabove may provide for coordinated congestion control of interference originating in one or more radio cells and affecting other, neighboring, radio cells. A radio network node which experiences neighbor cell interference may estimate the experienced neighbor cell interference, detect a sudden significant increase in the neighbor cell interference and signal, i.e. transmit, a message including an indicator to indicate this fact to neighboring radio network nodes. Upon receipt of a message including this indicator, one or a group of neighboring radio network nodes can analyze, check or otherwise investigate if their radio cells may be the potential cause of the sudden significant increase of the neighbor cell interference. If a radio network node determines that it is likely that this radio network node (or, rather wireless activities in cells served by this radio network node) caused the sudden significant increase of the neighbor cell interference, this radio network node can take appropriate measures to eliminate, alleviate or at least reduce its impact on the interference.

An advantage with some embodiments disclosed herein is that the proposed estimation of the neighbor cell interference is sufficiently accurate and has a sufficiently high bandwidth to enable a fast detection of the sudden significant increase of the neighbor cell interference, such as when new and strong neighbor cell interference occurs. It is another advantage with some of the embodiments herein that a radio network node can signal, or broadcast, messages to other neighboring radio network nodes that it experiences a sudden significant increase in interference. This allows for a coordinated congestion control of the interference among the various radio network nodes in a communication network. This may be particularly appealing in communication networks such as HetNets. It is a further advantage of some embodiments that a relatively fast detection of the sudden significant increase of the neighbor cell interference allows for a relatively quick coordinated congestion control among the various radio network nodes of the communication network.

Figure 11:
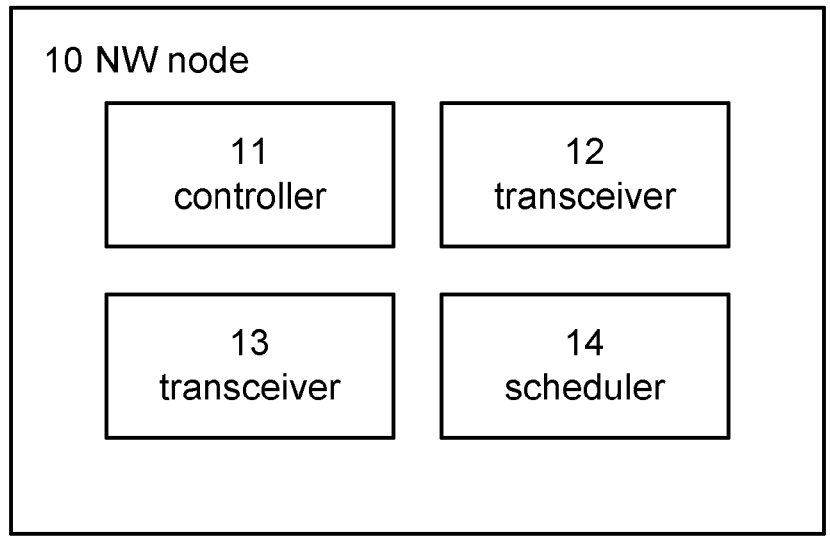
FIG. 11 shows an example embodiment of a first radio network node.
Figure 12:
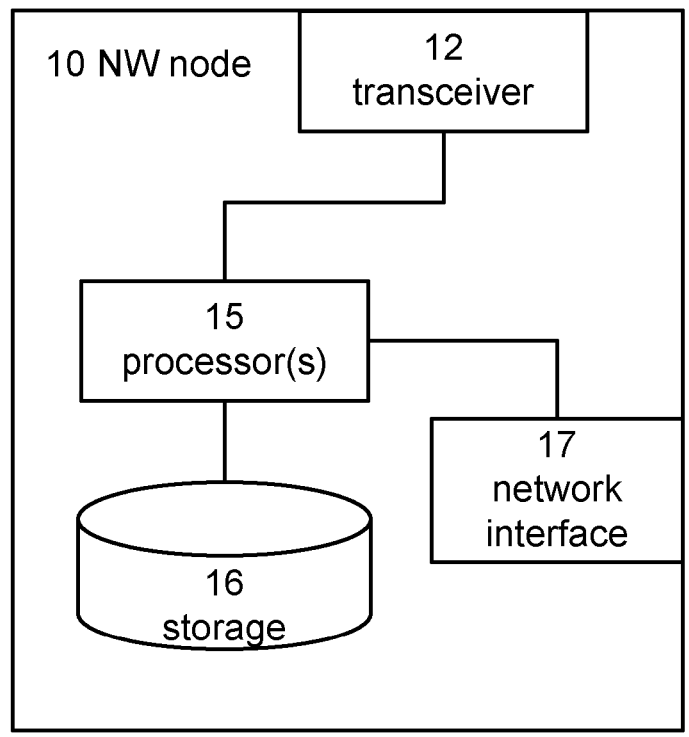
FIG. 12 shows another example embodiment of a first radio network node.

FIG. 11 illustrates an example embodiment of a first radio network node 10. The first radio network node may be configured to perform any of the methods disclosed herein with respect to FIGS. 3 and 4. The first radio network node may comprise several devices, units, modules or circuits. In the illustrated example embodiment of FIG. 11, the first radio network node 10 comprises a controller 11, a first transceiver 12, a second transceiver 13 and a scheduler 14. The transceiver 12 may be configured to wirelessly communicate with wireless terminals, such as UEs. The transceiver 13 may be configured to communicate with other radio network nodes and/or with core network nodes. Furthermore, the controller 11 may be configured to control the overall operations of the radio network node 10. FIG. 11 provides a logical view of an example radio network node 10. It is not strictly necessary that each device, or unit, is implemented as physically separate devices, or units. Some or all of the illustrated units may be implemented in a physical module. Alternatively, one or more units may be implemented in multiple physical modules as schematically illustrated in FIG. 12.

More specifically, and in accordance with one of its non-limiting aspects, the transceiver 12 may be configured to transmit and receive messages to and from at least one other radio network node configured to serve at least one other cell which is different from the cell of interest that is served by the first radio network node 10. Furthermore, the scheduler 14 may be configured to schedule UL transmissions from one or several UEs. The scheduler 14 is also configured to estimate a neighboring cell interference, the neighboring cell interference being induced in the cell of interest by wireless activities in at least one other cell which is different from the cell of interest. The scheduler 14 is further configured to detect a sudden significant increase in the estimated neighboring cell interference. Yet further, the transceiver 13 is configured to, in response to the scheduler 14 detecting the sudden significant increase in the estimated neighboring cell interference, transmit a message to at least one other radio network node that is serving at least one cell which is different from the cell of interest. The message includes an indicator indicating to said at least one other radio network node to initiate an interference congestion control procedure.

The scheduler 14 may be further configured to determine a change in the estimated neighboring cell interference occurring during a first time period, and also establishing that the determined change in the estimated neighboring cell interference is above a first threshold value. The length of the first time period may e.g. be in the range of 10-50 milliseconds, as described hereinabove. Also, the first threshold value may be in the range of 2-5 decibels (dB), as described hereinabove.

Additionally, or alternatively, the scheduler 14 may be configured to detect whether an increase of a neighboring cell interference has occurred during a first time period, and also determine that a sudden significant increase in the estimated neighboring cell interference has occurred when said increase of the neighboring cell interference is above a first threshold. The length of the first time period may e.g. be in the range of 10-50 milliseconds, as described hereinabove. Also, the first threshold value may be in the range of 2-5 decibels (dB), as described hereinabove.

The scheduler 14 may furthermore be configured to estimate the neighboring cell interference in accordance with any of the embodiments disclosed the unpublished U.S. patent application Ser. No. 13/488,187, which is incorporated herein (see Appendix A). For example, the scheduler 14 may be configured to estimate a load utilization probability $p_{load}(t_1)$ based at least on a load utilization probability estimate $\hat{p}_{load}(t_0)$ and an interference-and-noise sum estimate $\hat{P}_{other}(t_0)+\hat{P}_N(t_0)$ applicable at a time $t_0$ to obtain a load utilization probability estimate $\hat{p}_{load}(t_1)$ applicable at a time $t_1$, wherein $t_1-t_0=T>0$. The scheduler 14 may also be configured to estimate an interference-and-noise sum $P_{other}(t_1)+P_N(t_1)$ based at least on the load utilization probability estimate $\hat{p}_{load}(t_0)$ and the interference-and-noise sum estimate $\hat{P}_{other}(t_0)+\hat{P}_N(t_0)$ to obtain an interference-and-noise sum estimate $\hat{P}_{other}(t_1)+\hat{P}_N(t_1)$ applicable at the time $t_1$. The scheduler 14 may also be configured to estimate a neighbor cell interference $P_{other}(t_1)$ based at least on the interference-and-noise sum estimate $\hat{P}_{other}(t_1)+\hat{P}_N(t_1)$ and a thermal noise estimate $\hat{P}_N(t_1)$ to obtain a neighbor cell interference estimate $\hat{P}_{other}(t_1)$ applicable at the time $t_1$. As used here, the load utilization probability $p_{load}(t)$ may express a relationship between radio resource grants scheduled to one or more user equipments, UEs, and radio resource grants used by the same UEs applicable at a time t. Each UE may be a UE in the cell of interest, and the load utilization probability estimate $\hat{p}_{load}(t)$ may express an estimate of the load utilization $p_{load}(t)$. Furthermore, the interference-and-noise sum $P_{other}(t)+P_N(t)$ may express a sum of undesired signals, other than an own cell load $P_{own}(t)$, applicable at the time t, and the interference-and-noise sum estimate $\hat{P}_{other}(t)+\hat{P}_N(t)$ being an estimate thereof.

Also, the own cell load $P_{own}(t)$ may express a sum of signals due to wireless activities in the cell of interest applicable at the time t. Moreover, the neighbor cell interference $P_{other}(t)$ may express a sum of interferences present in the cell of interest due to wireless activities applicable at the time t in one or more cells other than in the cell of interest, and the neighbor cell interference estimate $\hat{P}_{other}(t)$ being an estimate thereof. Still further, a thermal noise $P_N(t)$ may express a sum of undesired signals present in the cell of interest at the time t other than the own cell load $P_{own}(t)$ and other than the neighbor cell interference $P_{other}(t)$, and the thermal noise estimate $\hat{P}_N(t)$ being an estimate thereof.

Still further, the scheduler 14 may optionally be configured to compare an estimated neighboring cell interference with a second threshold value. If so, the scheduler may be structured to detect the sudden significant increase in the estimated neighboring cell interference only in response to the estimated neighboring cell interference being above the second threshold value. The second threshold value may e.g. be in the range of 2-4 decibel over a thermal noise power floor value, i.e. for example 2, 2.5, 3, 3.5 or 4 dB over the thermal noise power floor value.

The devices, or units, of the radio network node 10 as illustrated in FIG. 11 need not be implemented strictly in hardware. It is envisioned that any of the units maybe implemented through a combination of hardware and software. For example, as illustrated in FIG. 12, the radio network node 10 may include one or more central processing units 15 executing program instructions stored in a storage 16 such as non-transitory storage medium or firmware (e.g., ROM (Read-Only Memory), RAM (Random-Access Memory), Flash memory) to perform the functions of the units. The storage 16 may also be referred to as a memory. The radio network node 10 may also include a transceiver 12 configured to receive wireless signals from UEs and to send signals to the UEs via one or more antennas (not shown). The radio network node 10 may further include a network interface 17 to communicate with other radio network nodes.

Figure 13:
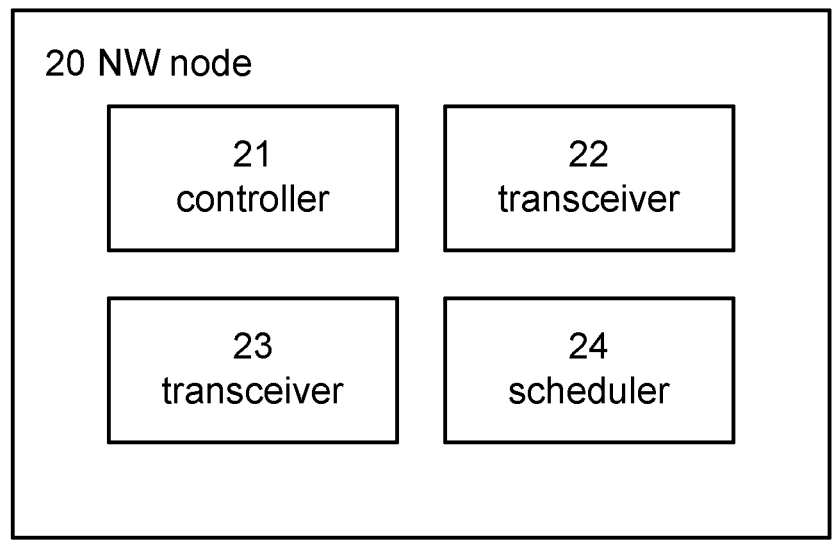
FIG. 13 shows an example embodiment of a second radio network node.
Figure 14:
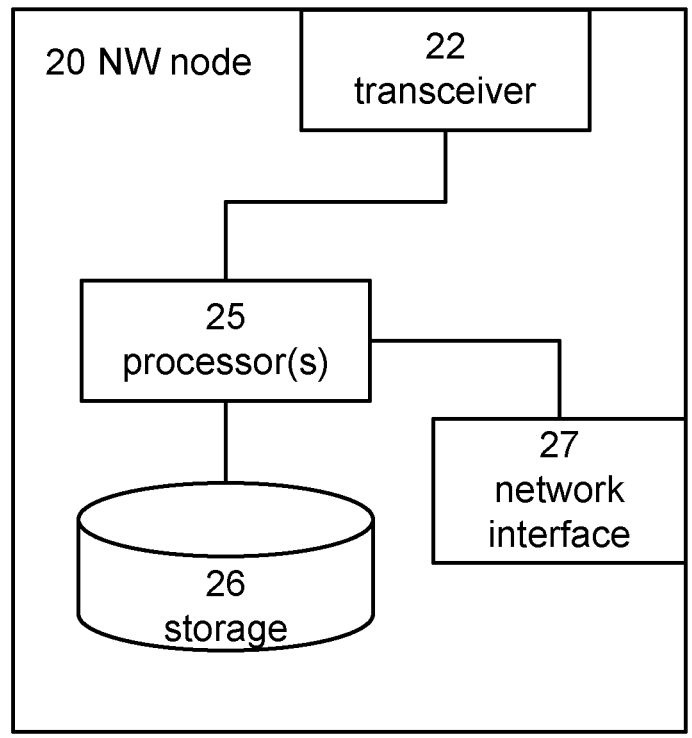
FIG. 14 shows another example embodiment of a second radio network node.

FIG. 13 illustrates an example embodiment of a second radio network node 20. The second radio network node 20 may be configured to perform any of the methods disclosed herein with respect to FIGS. 6-10. The second radio network node 20 may comprise several devices, units, modules or circuits. In the illustrated example embodiment of FIG. 13, the first radio network node 20 comprises a controller 21, a first transceiver 22, a second transceiver 23 and a scheduler 24. The transceiver 22 may be configured to wirelessly communicate with wireless terminals, such as UEs. The transceiver 23 may be configured to communicate with other radio network nodes and/or with core network nodes. Furthermore, the controller 21 may be configured to control the overall operations of the radio network node 20. FIG. 13 provides a logical view of an example radio network node. It is not strictly necessary that each device, or unit, is implemented as physically separate devices, units, modules or circuits. Some or all of the illustrated units may be implemented in a physical module. Alternatively, one or more units may be implemented in multiple physical modules as schematically illustrated in FIG. 14.

More specifically, and in accordance with one of its non-limiting aspects, the transceiver 22 may be configured to transmit and receive messages to and from one or more user equipments, UEs. Also, the transceiver 23 may be configured to transmit and receive messages to and from at least one other radio network node. The transceiver 23 is also configured to receive a message from said at least one other radio network node, wherein said message includes an indicator indicating to the second radio network node that it shall initiate an interference congestion control procedure. Furthermore, the scheduler 24 is configured to schedule uplink transmissions from the UEs. Still further, the scheduler 24 is be configured to, in response to the transceiver 23 receiving said message, analyze the scheduling of one or more user equipments, UEs, to determine a likelihood that the second radio network node caused a sudden significant increase in an estimated neighboring cell interference. Also, the scheduler 24 may be configured to control uplink interference congestion in dependence of the determined likelihood that the second radio network node caused the sudden significant increase in the estimated neighboring cell interference.

In one embodiment, the scheduler 24 may be configured to read a history of uplink, UL, grants for said one or more UEs from a memory of the second radio network node, wherein the history of UL grants includes information on the amount of UL grants scheduled during a second time period. The scheduler 24 may also be configured to analyze the history of UL grants to determine whether an increase of the amount of scheduled UL grants has occurred during said second time period. If it is determined that an increase of the amount of UL grants has occurred during said second time period, the scheduler 24 is also configured to compare the detected increase of the amount of scheduled UL grants with a third threshold value, and also control the UL interference congestion if the detected increase of the amount of scheduled UL grants is above the third threshold. The length of the second time period may be in the range of 10 to 80 milliseconds. That is, the length of the second time period may e.g. be 10, 15, 20, 25, 30, 35, 40, 45, 50, 55, 60, 65, 70, 75 or 80 milliseconds. Also, the third threshold value may be a value which is in the range of 30-60 percent of the maximum amount of scheduled UL grants that can be assigned by the second radio network node.

Additionally, or alternatively, the scheduler 24 may be configured to read a history of transmit powers of said one or more UEs from a memory of the second radio network node, wherein the history of transmit powers includes information on the transmit powers of said one or more UEs during a third time period. The scheduler 24 may also be configured to analyze the history of transmit powers to determine whether an increase of transmit powers has occurred during said third time period. If it is determined that an increase of the transmit powers has occurred during said third time period, the scheduler 24 may be further configured to compare the detected increase of the transmit powers with a fourth threshold value; and also control the UL interference congestion if the detected increase of the transmit powers is above the fourth threshold. The length of the third time period may be in the range of 10 to 80 milliseconds. That is, the length of the second time period may e.g. be 10, 15, 20, 25, 30, 35, 40, 45, 50, 55, 60, 65, 70, 75 or 80 milliseconds. Also, the fourth threshold value is a value which is in the range of 5-15 decibel. For example, the fourth threshold value may be 5, 10 or 15 db.

In some embodiments, the scheduler 24 is configured to control the UL interference congestion by transmitting, by means of transceiver 22, a message to one or more UEs, wherein said message comprises an information element including a request to the one or more UEs to decrease the allowable UL data rate. In some embodiments, the scheduler 24 is configured to control the UL interference congestion by transmitting, by means of transceiver 22, a message to one or more UEs, wherein said message comprises an information element including a request to the one or more UEs to reduce the transmission power.

The units of the radio network node 20 as illustrated in FIG. 13 need not be implemented strictly in hardware. It is envisioned that any of the units maybe implemented through a combination of hardware and software. For example, as illustrated in FIG. 14, the radio network node 20 may include one or more central processing units 15 executing program instructions stored in a storage (e.g. memory) 16 such as non-transitory storage medium or firmware (e.g., ROM, RAM, Flash) to perform the functions of the units. The radio network node 10 may also include a transceiver 12 configured to receive wireless signals from UEs and to send signals to the UEs via one or more antennas (not shown). The radio network node 10 may further include a network interface 17 to communicate with other radio network nodes.

It should be appreciated that a single radio network node may implement the functionality as described hereinabove with respect to both the first radio network node 10 and the second radio network node 20, respectively. Consequently, a radio network node may comprise devices, units, modules or circuits of the first radio network node 10 as well as the second radio network node 20.

According to some embodiments, the first radio network node 10 may be embodied as a RBS, e.g. a NodeB. In other embodiments, the first radio network node 10 may be embodied as a Radio Network Controller (RNC).

Similarly, the second radio network node 20 may be embodied as a RBS, e.g. a NodeB. In other embodiments, the second radio network node 20 may be embodied as a RNC. Thus, there exist various alternatives, such as for example the following:

The first radio network node 10 may be a RBS and the second radio network node 20 may be a RBS (utilizing signaling over an Iub interface or a proprietary interface to the RNC, then from the RNC to the second radio network node over Iub or over a proprietary interface).

The first radio network node 10 may be a RBS and the second radio network node 20 may be a RBS (e.g. utilizing signaling over a proprietary interface, Iubx interface).

The embodiments disclosed herein are also conceivable in LTE. If implemented in LTE, the first and second radio network nodes 10, 20 may be implemented as evolved NodeB's (eNB's). If so the signaling can be over the X2 interface between the eNB's.

In the detailed description hereinabove, for purposes of explanation and not limitation, specific details are set forth in order to provide a thorough understanding of various embodiments described in this disclosure. In some instances, detailed descriptions of well-known devices, units, modules, components, circuits, and methods have been omitted so as not to obscure the description of the embodiments disclosed herein with unnecessary detail. All statements herein reciting principles, aspects, and embodiments disclosed herein, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure. Thus, for example, it will be appreciated that block diagrams herein can represent conceptual views of illustrative circuitry or other functional units embodying the principles of the embodiments. Similarly, it will be appreciated that any flow charts and the like represent various processes which may be substantially represented in computer readable medium and so executed by a computer or processor, whether or not such computer or processor is explicitly shown. The functions of the various elements including functional blocks, may be provided through the use of hardware such as circuit hardware and/or hardware capable of executing software in the form of coded instructions stored on computer readable medium. Thus, such functions and illustrated functional blocks are to be understood as being either hardware-implemented and/or computer-implemented, and thus machine-implemented. In terms of hardware implementation, the functional blocks may include or encompass, without limitation, digital signal processor (DSP) hardware, reduced instruction set processor, hardware (e.g., digital or analog) circuitry including but not limited to application specific integrated circuit(s) [ASIC], and/or field programmable gate array(s) (FPGA(s)), and (where appropriate) state machines capable of performing such functions. In terms of computer implementation, a computer is generally understood to comprise one or more processors or one or more controllers. When provided by a computer or processor or controller, the functions may be provided by a single dedicated computer or processor or controller, by a single shared computer or processor or controller, or by a plurality of individual computers or processors or controllers, some of which may be shared or distributed. Moreover, use of the term "processor" or "controller" shall also be construed to refer to other hardware capable of performing such functions and/or executing software, such as the example hardware recited above.

Although the various embodiments of this disclosure have been described above with reference to specific embodiments, it is not intended to be limited to the specific form set forth herein. The embodiments of this disclosure are limited only by the accompanying claims and other embodiments than the specific above are equally possible within the scope of the appended claims. As used herein, the terms "comprise/comprises" or "include/includes" do not exclude the presence of other elements or steps. Furthermore, although individual features may be included in different claims, these may possibly advantageously be combined, and the inclusion of different claims does not imply that a combination of features is not feasible and/or advantageous. In addition, singular references do not exclude a plurality. Finally, reference signs in the claims are provided merely as a clarifying example and should not be construed as limiting the scope of the claims in any way.

The invention claimed is:

1. A method for uplink interference congestion control performed by a first radio network node serving a cell of interest, the method comprising:
   estimating a neighboring cell interference, the neighboring cell interference being induced in the cell of interest by wireless activities in at least one other cell which is different from the cell of interest, wherein estimating the neighboring cell interference comprises:
      estimating a load utilization probability $p_{load}(t_1)$ based at least on a load utilization probability estimate $\hat{p}_{load}(t_0)$ and an interference-and-noise sum estimate $\hat{P}_{other}(t_0)+\hat{P}_N(t_0)$ applicable at a time $t_0$ to obtain a load utilization probability estimate $\hat{p}_{load}(t_1)$ applicable at a time $t_1$, wherein $t_1-t_0=T>0$;
      estimating an interference-and-noise sum $P_{other}(t_1)+P_N(t_1)$ based at least on the load utilization probability estimate $\hat{p}_{load}(t_0)$ and the interference-and-noise sum estimate $\hat{P}_{other}(t_0)+\hat{P}_N(t_0)$ to obtain an interference-and-noise sum estimate $\hat{P}_{other}(t_1)+\hat{P}_N(t_1)$ applicable at the time $t_1$; and
      estimating a neighbor cell interference $P_{other}(t_1)$ based at least on the interference-and-noise sum estimate $\hat{P}_{other}(t_1)+\hat{P}_N(t_1)$ and a thermal noise estimate $\hat{P}_N(t_1)$ to obtain a neighbor cell interference estimate $\hat{P}_{other}(t_1)$ applicable at the time $t_1$,
   wherein the load utilization probability $p_{load}(t)$ expresses a relationship between radio resource grants scheduled to one or more user equipments, UEs, and radio resource grants used by the same UEs applicable at a time t, each UE being a UE in the cell of interest, and the load utilization probability estimate $\hat{p}_{load}(t)$ being an estimate thereof,
   wherein the interference-and-noise sum $P_{other}(t)+P_N(t)$ expresses a sum of undesired signals, other than an own cell load $P_{own}(t)$, applicable at the time t, and the interference-and-noise sum estimate $\hat{P}_{other}(t)+\hat{P}_N(t)$ being an estimate thereof,
   wherein the own cell load $P_{own}(t)$ expresses a sum of signals due to wireless activities in the cell of interest applicable at the time t,
   wherein the neighbor cell interference $P_{other}(t)$ expresses a sum of interferences present in the cell of interest due to wireless activities applicable at the time t in one or more cells other than in the cell of interest, and the neighbor cell interference estimate $\hat{P}_{other}(t)$ being an estimate thereof, and
   wherein a thermal noise $P_N(t)$ expresses a sum of undesired signals present in the cell of interest at the time t other than the own cell load $P_{own}(t)$ and other than the neighbor cell interference $P_{other}(t)$, and the thermal noise estimate $\hat{P}_N(t)$ being an estimate thereof;
   detecting a sudden significant increase in the estimated neighboring cell interference; and
   in response to detecting the sudden significant increase in the estimated neighboring cell interference, transmitting a message to at least one other radio network node that is serving at least one cell which is different from the cell of interest, wherein the message includes an indicator indicating to said at least one other radio network node to initiate an interference congestion control procedure.

2. The method according to claim 1, wherein detecting a sudden significant increase in the estimated neighboring cell interference comprises:
   determining a change in the estimated neighboring cell interference occurring during a first time period; and
   establishing that the determined change in the estimated neighboring cell interference is above a first threshold value.

3. The method according to claim 2, wherein the length of the first time period is in the range of 10 to 50 milliseconds.

4. The method according to claim 2, wherein the first threshold value is in the range of 2-5 decibels.

5. The method according to claim 1, further comprising comparing the estimated neighboring cell interference with a second threshold value, wherein detecting the sudden significant increase in the estimated neighboring cell interference is performed only in response to the estimated neighboring cell interference being above the second threshold value.

6. The method according to claim 5, wherein the second threshold value is in the range of 2-4 decibel over a thermal noise power floor value.

7. A first radio network node for uplink interference congestion control, comprising:
- a transceiver that transmits and receives messages to and from at least one other radio network node that serves at least one other cell which is different from the cell of interest; and
- a scheduler that schedules uplink transmissions from at least one user equipment, UE, wherein the scheduler also:
    estimates a neighboring cell interference, the neighboring cell interference being induced in the cell of interest by wireless activities in at least one other cell which is different from the cell of interest, wherein in estimating the neighboring cell interference, the scheduler:
        estimates a load utilization probability $p_{load}(t_1)$ based at least on a load utilization probability estimate $\hat{p}_{load}(t_0)$ and an interference-and-noise sum estimate $\hat{P}_{other}(t_0)+\hat{P}_N(t_0)$ applicable at a time $t_0$ to obtain a load utilization probability estimate $\hat{p}_{load}(t_1)$ applicable at a time $t_1$, wherein $t_1-t_0=T>0$;
        estimates an interference-and-noise sum $P_{other}(t_1)+P_N(t_1)$ based at least on the load utilization probability estimate $\hat{p}_{load}(t_0)$ and the interference-and-noise sum estimate $\hat{P}_{other}(t_0)+\hat{P}_N(t_0)$ to obtain an interference-and-noise sum estimate $\hat{P}_{other}(t_1)+\hat{P}_N(t_1)$ applicable at the time $t_1$; and
        estimates a neighbor cell interference $P_{other}(t_1)$ based at least on the interference-and-noise sum estimate $\hat{P}_{other}(t_1)+\hat{P}_N(t_1)$ and a thermal noise estimate $\hat{P}_N(t_1)$ to obtain a neighbor cell interference estimate $\hat{P}_{other}(t_1)$ applicable at the time $t_1$,
        wherein the load utilization probability $p_{load}(t)$ expresses a relationship between radio resource grants scheduled to one or more user equipments, UEs, and radio resource grants used by the same UEs applicable at a time t, each UE being a UE in the cell of interest, and the load utilization probability estimate $\hat{p}_{load}(t)$ being an estimate thereof,
        wherein the interference-and-noise sum $P_{other}(t)+P_N(t)$ expresses a sum of undesired signals, other than an own cell load $P_{own}(t)$, applicable at the time t, and the interference-and-noise sum estimate $\hat{P}_{other}(t)+\hat{P}_N(t)$ being an estimate thereof,
        wherein the own cell load $P_{own}(t)$ expresses a sum of signals due to wireless activities in the cell of interest applicable at the time t,
        wherein the neighbor cell interference $P_{other}(t)$ expresses a sum of interferences present in the cell of interest due to wireless activities applicable at the time t in one or more cells other than in the cell of interest, and the neighbor cell interference estimate $\hat{P}_{other}(t)$ being an estimate thereof, and
        wherein a thermal noise $P_N(t)$ expresses a sum of undesired signals present in the cell of interest at the time t other than the own cell load $P_{own}(t)$ and other than the neighbor cell interference $P_{other}(t)$, and the thermal noise estimate $\hat{P}_N(t)$ being an estimate thereof; and
    detect a sudden significant increase in the estimated neighboring cell interference;
and wherein
the transceiver that, in response to detecting the sudden significant increase in the estimated neighboring cell interference transmits a message to at least one other radio network node that is serving at least one cell which is different from the cell of interest, wherein the message includes an indicator indicating to said at least one other radio network node to initiate an interference congestion control procedure.

* * * * *